United States Patent [19]

Koll

[11] Patent Number: 4,526,527

[45] Date of Patent: Jul. 2, 1985

[54] ROUND TOP RIMMING MACHINE

[75] Inventor: Eugene A. Koll, Moundsview, Minn.

[73] Assignee: Champion International Corporation, Stamford, Conn.

[21] Appl. No.: 505,688

[22] Filed: Jun. 20, 1983

Related U.S. Application Data

[63] Continuation-in-part of Ser. No. 357,837, Mar. 15, 1982, Pat. No. 4,433,968.

[51] Int. Cl.[3] ............................................ B29C 17/02

[52] U.S. Cl. .................................. 425/90; 184/6.26; 425/392

[58] Field of Search .......................... 425/90, 95, 392; 184/6.26

[56] References Cited

U.S. PATENT DOCUMENTS

| | | | |
|---|---|---|---|
| 1,509,582 | 9/1924 | Borchers . | |
| 2,629,160 | 2/1953 | Briggs | 425/95 |
| 2,856,667 | 10/1958 | Gorsuch | 425/95 |
| 2,969,879 | 1/1961 | Belcher | 184/6.26 |

OTHER PUBLICATIONS

Parker Catalog Sheets, pp. 12 and 13.

Trico "Atlas" Gravity Feed Oilers, pp. 12 and 13.

*Primary Examiner*—James Derrington

*Attorney, Agent, or Firm*—Evelyn M. Sommer; John H. Mulholland; William W. Jones

[57] ABSTRACT

Disclosed is an apparatus for lubricating and beading the edge or rim of a cup having a seamed annular sidewall and a polygonal base. A 360° spray means sprays the inside top margin of the cup wall with water to lubricate and a spinning head having a plurality of radially moveable forming members for contact with the rim subsequently produces the bead. The lubricator has a deflector which moves by means of an air cylinder axially into contact with the top annular wall end to close the end and to direct and combine a water mist created by a 360° spray set up which atomizes the water to a mist by means pressurized air. For the bead forming operation, a base plate together with relatively moveable socket forming wall members provides a seat for the cup on a cam operated elevator device which moves the cup upwardly. The socket is complementary to the polygonal base to prevent rotation of the seated and supported cup relative to the socket. The socket walls retract into a common horizontal plane with the base plate to permit rotationally driven star wheels to first restrain the cups at the lubricating station and then to guide and confine cups onto the base plate in register with the bead forming means and off of the base plate away from the bead forming means. An air stream is directed into the cup to produce a positive pressure which inhibits dust from entering the cup during the bead forming operation.

9 Claims, 3 Drawing Figures

ROUND TOP RIMMING MACHINE

BACKGROUND OF THE INVENTION

This application is a continuation-in-part of U.S. patent application Ser. No. 357,837 filed Mar. 15, 1982, now U.S. Pat. No. 4,433,968.

The invention relates to an improved method and apparatus for beading a cup edge and particularly for lubricating the inside top margin of the annular cup wall before forming the beaded rim of the cup.

It has been known previously to provide the annular wall of a container with a beaded rim by grasping or otherwise restraining the container against rotation and holding it against a bead forming spinning head. An example of such a typical grasping device in combination with a conventional head is shown in U.S. Pat. No. 4,204,462 to Richards, et al. The parent application referred to above discloses and claims star wheels to guide and confine a polygonal based cup, which cup includes an annular wall to be beaded by a spinning operation, in combination with a complementary polygonal socket to prevent cup rotation.

Lubrication of the inside top margin of the cup wall with oil before forming the beaded rim of the cup, typically, by means of a brush, has been known previously. The oil, however, has a tendency to stain the cup material and to smear any printed indicia thereon. Moreover, oil tends to drip into the carton and ultimately get into the product packaged. Oil also collects on the forming and filling machinery and picks up dirt and carton dust created by the forming operation. To minimize or alleviate these problems, applicant has discovered a novel method and apparatus which utilizes atomized plain water as a lubricant in a manner which enhances the bead producing spinning operation. Other non-toxic aqueous solutions might also be advantageous, but atomized plain water is preferred because it evaporates and does not stain the carton.

SUMMARY OF THE INVENTION

The invention relates to a method and apparatus for lubricating the top margin of an annular cup wall with atomized water to enhance beading of the annular rim of the cup. The apparatus includes a base for guiding and supporting the cup in an upstanding position as it moves into and out of the lubricating position. A deflector having a generally cone shaped interior of a magnitude sufficient to act as an end closure for the annular wall top end is mounted for axial movement by means of a fluid cylinder into and out of engagement with the top end. Spray means are mounted centrally within the deflector for axial movement therewith. A 360° spray set up produces an annular spray pattern of atomized water on the inside top margin of the annular wall of the cup during engagement of the deflector with the annular wall top end of the cup.

The atomized water is obtained from a nozzle assembly which typically includes an air and a water connection and a fluid cap and air cap mounted to provide the 360° annular spray pattern. The water connection is attached to a conduit from a pressurized or gravity fed source of water and the air connection is attached to a conduit from a pressurized source of air. The water is controlled by a first or water solenoid valve mounted in the water conduit between the water source and the nozzle and the air is controlled by a second or air solenoid valve mounted in the air conduit between the air source and the nozzle. The conduits are flexible to accommodate the axial motion of the nozzle and the solenoid valves are timed to first permit the deflector to engage the top end of the cup and then to admit in sequence, a small amount of water and then, a supply of air to force the water out in a 360 spray pattern of atomized water in the form of a mist. The cone shape of the deflector is substantially the same angle from the vertical as is the direction of spray. This permits the deposit of substantially all of the mist on only the top margin of the annular wall of the cup. Any small amount which lands on the rest of the cup quickly evaporates without staining or smearing any printing indicia thereon. When the air solenoid shuts off the pressurized air supply, the deflector and spray set up returns axially to the up position out of engagement with the annular wall top end of the cup and the lubricated cup moves laterally along the support to the rimming station as the next cup to be lubricated moves into position to be closed by the deflector and sprayed.

Further details of the apparatus will be apparent from the drawings and the detailed description of the preferred embodiment to follow.

DETAILED DESCRIPTION OF THE ILLUSTRATED EMBODIMENT

Figure 1:
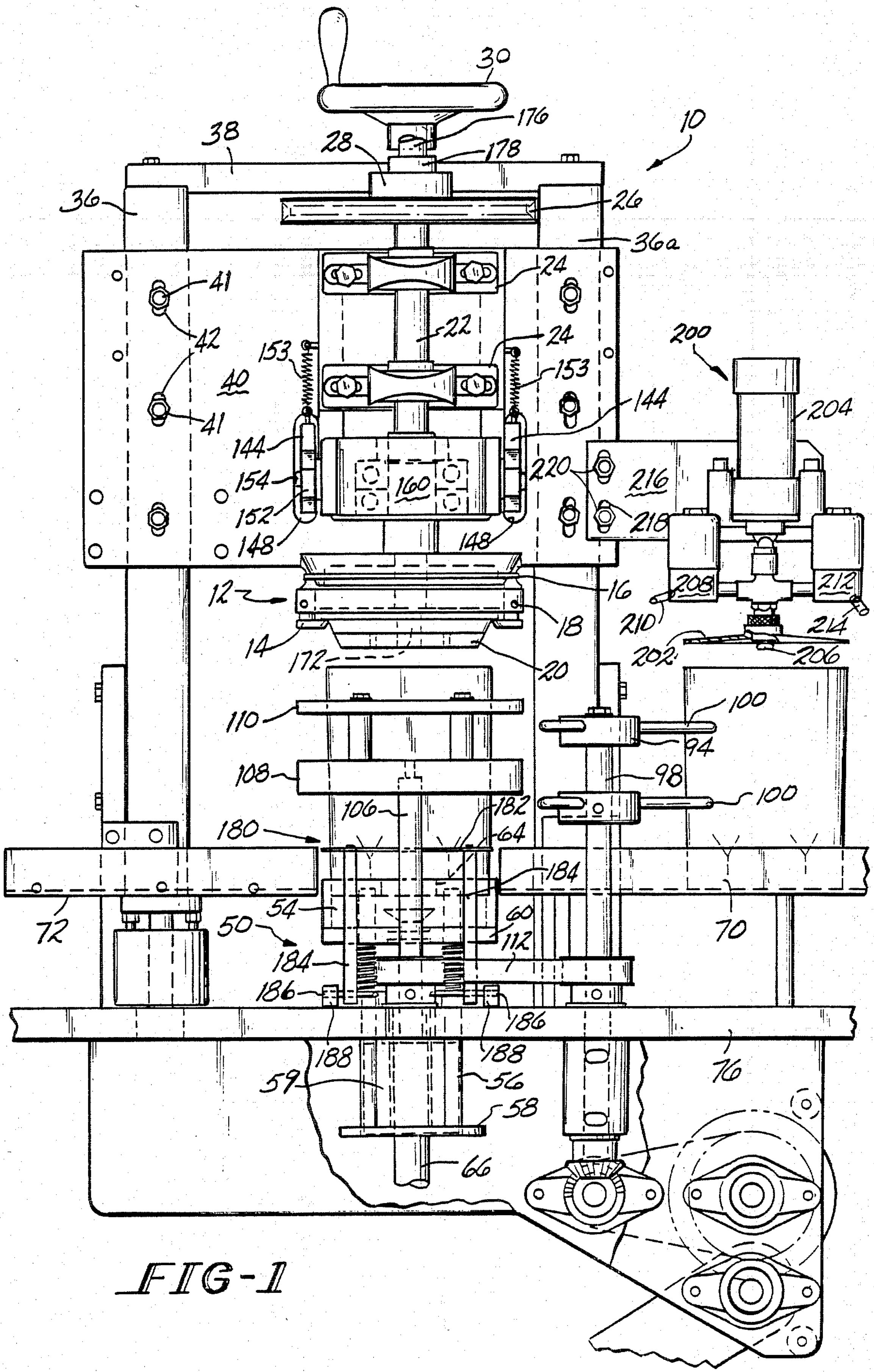
FIG. 1 is a partial front elevational view of an apparatus for lubricating and beading a cup made in accordance with the principals of the invention, with portions broken away for clarity.
Figure 2:
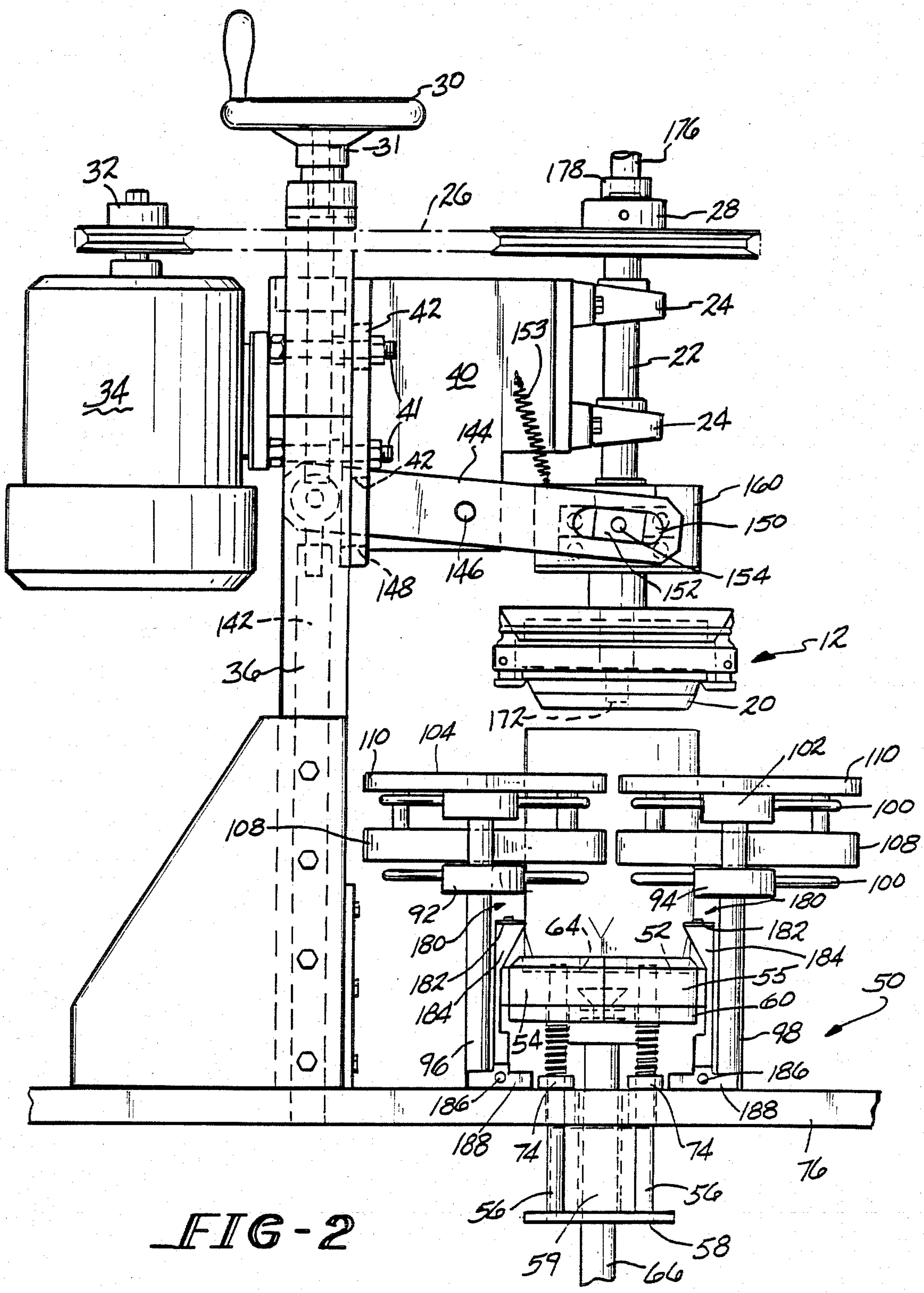
FIG. 2 is a partial side elevation of the apparatus of FIG. 1.
Figure 3:
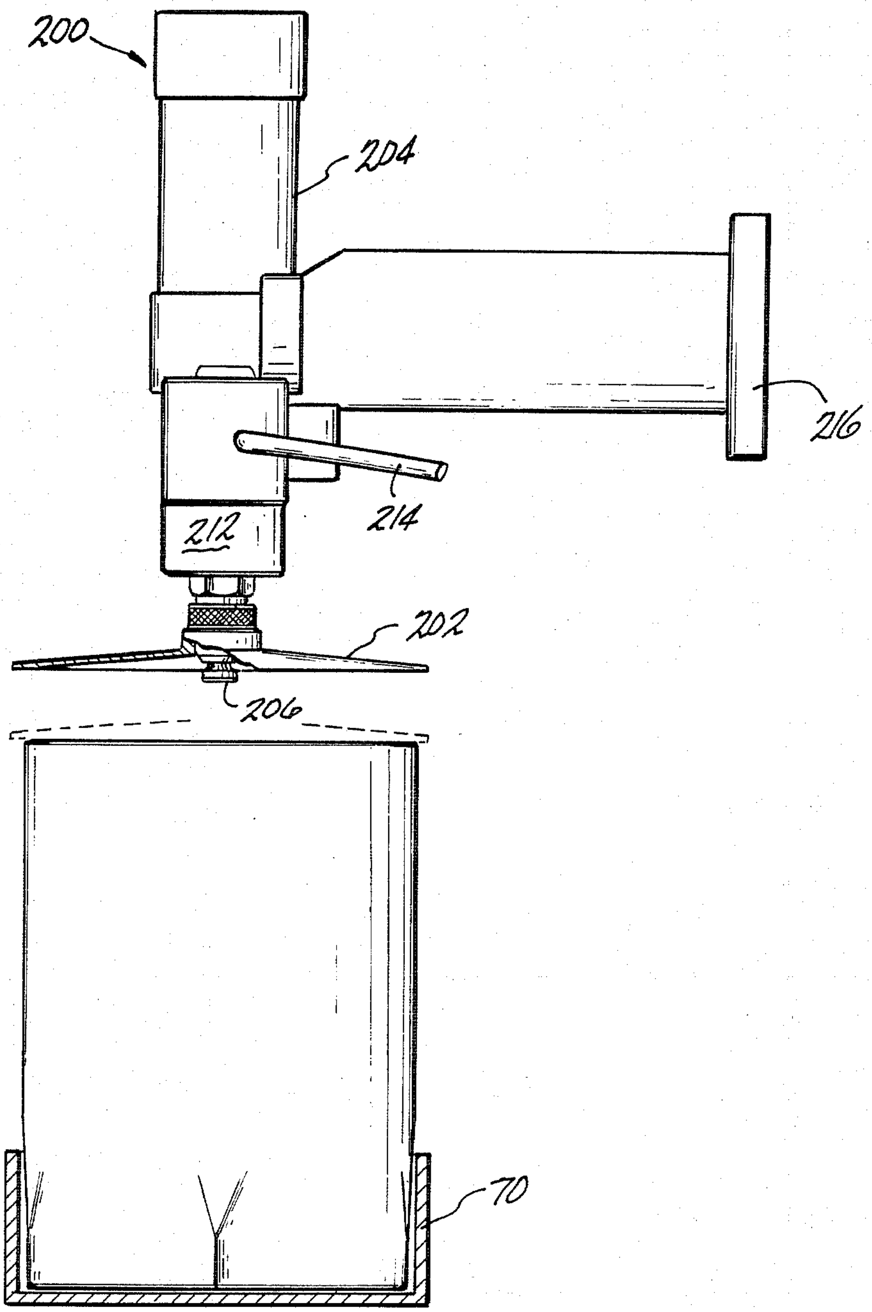
FIG. 3 is a side elevational view of the lubrication portion of the apparatus shown in FIG. 1.

The apparatus for lubricating and beading the edge of a cup having a seamed annular sidewall and polygonal base is generally designated in the drawings by the numeral 10.

The apparatus 10 includes a conventional spinning head generally designated by the numeral 12. The head 12 has a plurality of radially moveable forming members 14 for contact with the rim of a cup having a seamed annular sidewall and a polygonal base. The forming members 14 are outwardly biased by spring means 16 and pivot about pins 18. Radially inward movement of members 14 against the bias of spring means 16 is accomplished by movement of camming cone 20 against the upper ends of mambers 14.

A shaft 22 is rotationally mounted in bearing blocks 24 and is driven by belt 26 and pulley 28 fixed on hollow shaft 22. Axial adjustment of head 12 and motor 34 is made by and wheel 30 and a threaded shaft 31 to which it is affixed. Belt 26 is driven by motor 34 through pulley 32.

The spinning head 12 and motor 34 are mounted on a frame which includes upstanding members 36 and 36*a* and cross member 38. A support member 40 is attached by means of bolts 41 in slots 42 to the upstanding members 36 and 36*a* and acts as an adjustable mounting plate for the bearing blocks 24 and motor 34.

To accomplish vertical adjustment of the bearing blocks 24 and motor 34, as well as the spinning head 12, the hand wheel 30 drives threaded shaft 31, to which it is fixed, creating vertical movement of the member 40 by means of a threaded block (not shown) rigidly attached thereto and operably engaged by the threads of the shaft 31.

A means for supporting a cup having an annular sidewall and polygonal base to be provided with a beaded rim is generally designated by the numberal 50 and is located in register below the spinning head 12. The supporting means 50 includes a base plate 52 surrounded by a pair of socket defining members 54 and 55 which together define a polygonally shaped socket, which is a hexagon as illustrated, slightly larger than but similar to the polygonal shape of the base. Base plate 52 is mounted on four shafts 56 connected at their lower base by common plate 58. The plate 58 moves with shafts 56 and has a central opening to clear a bushing assembly 59 during relative motion therebetween.

The shafts 56 pass through an elevator plate 60 which has mounted centrally thereof and on the upper surface thereof a vacuum cup 62. The vacuum cup 62 during relative motion of the elevator plate 60, and the base plate 52 passes through a central opening 64 in base plate 52. The polygonally shaped based plate 52 remains stationary as shown there, shaft 142 creates pivot motion until the elevator plate 60 rises upwardly in to face to face engagement therewith. At this point the vacuum cup 62 extends through and above the opening 64 in base plate 52 for holding engagement with the cup bottom. The purpose of cup 62 is ultimately to pull the cup away from formers 14.

The vertical driving motion of the plate 60 is accomplished by means of cam driven shaft 66. The cam details are illustrated in the parent application. As shaft 66 drives elevator plate 60 initially upwardly, the socket defining members 54 and 55 move up and surround base plate 52 to define the hexagonal socket. Once the elevator plate 60 engages base plate 52, the thus defined socket continues upwardly with the base plate as a unit until a cup located in the socket engages the formers 14 of the spinning head 12.

The base plate 52 in its lowered position is in aligned relationship with the cup entrance slide 70 and the cup exit slide 72. It is held in this position by means of collars 74 which are fixed on shafts 56 and rest on the upper surface of a horizontal frame plate 76 of the machine 10 when the base is in its lowest position.

The cups are pushed along the cup entrance slide 70 toward base plate 52 by conveying means (not shown) until they engage a pair of star wheels 92 and 94 located on opposite sides of the slide 70. The star wheels 92 and 94 are fixed to rotatable shafts 96 and 98, respectively, and each include arms 100 which guide and confine the cups into and on the base plate 52 in register with spinning head 12.

Before the cups move along the entrance slide 70 toward base plate 52 but while they are engaged by star wheels 92 and 94, the lubricating portion of the apparatus generally designated 200 acts upon them.

The lubricating portion 200 of the apparatus lies above the slide or base 70 in register with the cups when they are at rest but engaged by the star wheels 92 and 94. Immediately above the cup at this lubricating station is a deflector 202 having a generally cone shaped interior of a magnitude sufficient to act as an end closure for the cup annular wall top end. The deflector 202 is mounted for axial movement into and out of engagement with the top end by means of a fluid cylinder, preferably a "Miller P72 1" stroke and 1½" bore air cylinder, 204. A spray means or spray set up 206 is mounted centrally within the deflector 202 for axial movement therewith. The spray means 206 produces an annular spray pattern of atomized water on the inside top margin of the annular wall of the cup during engagement of the deflector 202 with the annular wall top end of the cup.

The atomized water is obtained from spray means 206 which includes an air and a water connection and a fluid cap and air cap mounted to provide the 360° annular spray pattern. These spray set ups are available from the Spraying Systems Company of North Avenue at Schmale Road, Wheaton, Ill. 60187, and are sold as "¼J Air Atomizing" nozzle assemblies. The 360° circular spray fluid cap is catalog number 60150 and the air cap is catalog number 189-6-62-160HC. These parts are available for different air pressures in pounds per square inch, liquid capacities in gallons per hour and air capacity in standard cubic feet per minute. For the instant purposes, the liquid, i.e. water, used is only about two drops per cup and the air pressure supplied is slightly under 20 psi.

The water connection of the nozzle is attached to a conduit which includes a first or water solenoid valve 208 and a flexible water hose 210 which leads to a gravity fed or a pressurized water source (not shown). The air connection of the nozzle is attached to a conduit which includes a second or air solenoid valve 212 and a flexible air hose 214 which leads to a pressurized air source (not shown). The hoses 210 and 214 are flexible to accommodate the axial motion of the spray means 206 and deflector 202, as created by air cylinder 204.

The solenoid valves 208 and 212 are timed with air cylinder 204 to first permit the deflector 202 to engage the top end of the cup and then to admit in sequence a small amount of water, typically two drops, and then, a supply of air to force the water out in a 360° spray pattern of atomized water in the form of a mist. The cone shape of the deflector 202 is substantially the same angle from the vertical as is the direction of spray. This permits the deposit of substantially all of the mist on only the top margin of the annular wall of the cup. Any small amount which lands on the rest of the cup quickly evaporates without staining or smearing any printed indicia thereon. When air solenoid 212 shuts off the pressurized air supply, the deflector 202 and spray set up 206 returns axially to the up position out of engagement with the annular wall top end of the cup and the lubricated cup moves laterally through star wheels 92 and 94, along the entrance slide 70, to the rimming station on base plate 52 as the next cup to be lubricated moves into position against star wheels 92 and 94. The next cup is then closed by the deflector 202 and sprayed.

A similar pair of star wheels 102 and 104 located on either side of supporting means 50 rotate on shafts 106 and have spaced contoured plastic plates 108 and 110 fixed for rotation with shaft 106 to guide and confine the upper portion of the cups with regard to the base plate 58 and the socket it defines with members 54 55.

The star wheels 92 and 94 and 102 and 104 are rotationally mounted on plate 76 and are connected by drive belt 112.

The drive, as explained in the patent application, alternates 120° of drive with 240° of dwell thus stopping the star wheels during the dwell for movement of the cup supporting means 50 up and down to form the bead on the cup.

A shaft drives a cam to control the timing sequence of the reciprocation of the elevator plate 60 and supporting means 50 by means of reciprocating shaft 66. The shaft is conventionally rotationally driven from any power source. The lubricator air cylinder 204 and solenoid valves 208 and 212 may be controlled by a conventional electric circuit, if desired, but this is preferably done with the internal drive unit as described above and in the parent application.

As described and shown there, shaft 142 creates pivot motion in a pair of arms 144 about a pin or pins 146 mounted to extend from either side of member 40. The arms 144 each move in a slot 148 in member 40.

The outer ends of arms 144 have slots 150 with sliding blocks 152 mounted therein for movement as arms 144 are pivoted. The arms may be spring biased upwardly at their outer ends by springs 153 attached to member 40. Downward movement of the ends of arms 144 moves blocks 152 along slots 150 and pivots the blocks about pins 154 lowering a bushing block 160 mounted for movement on shaft 22 such that it is over and connected to the camming cone 20 of spinning head 12. Accordingly, movement of the ends of arms 144 move blocks 152 which move camming cone 20 against the upper ends of forming members 40 into engagement with the cup edge to form the bead in a timed sequence depending on cam 132. Raising arms 144 and cam 20 releases the cup bead from formers 14.

As the cups advance along slide 70, they are pushed by cups behind them being conveyed from the cup former (not shown). The star wheels 92 and 94 rotate to retain the cups at the lubricating station and to guide and confine the cup closest to the end of slide 70 over the ends of lowered socket defining members 54 and 55 onto the base plate 52. The cup engaged by the arms 100 of star wheels 92 and 94 is restrained in position under the lubricator apparatus. Therefore, the line is restrained by the arms 100 until it is indexed forward first to the lubricating station and then onto base plate 52 during the next rotation of the star wheels. Star wheels 102 and 104 engage the upper part of the cup during final positioning of the cup on plate 52.

As the cup enters onto the base plate 52 and is confined by the star wheels 102 and 104, the shaft 66 moves the elevator plate 60 and vacuum cup 62 upwardly until the former hits base plate 52 and the latter passes through the base plate 52 and engages the cup bottom. Additional star wheels to aid this action can also be provided. As shaft 66 continues upwardly the entire elevator assemblege or cup supporting means 50 including socket defining members 54 and 55, base plate 52, elevator plate 60 and the cup engaging vacuum cup 62 moves upwardly to engage the cup rim edge in bead formers 14.

After radial movement of the formers 14 to release the cup the support means 50 lowers and the vacuum cup 62 brings the beaded cup downwardly with it. The cup is stripped from vacuum cup 62 as it passes back through opening 64 in base plate 52. As the next lubricated cup comes in, the beaded cup exits via slide 72.

As the spinning head 12 and formers 14 make the bead, any dust is kept out of the cup by a positive pressure created by an air stream emitting from an air passage 172 at the end of hollow shaft 22. The upper end of hollow shaft 22 is connected to a pressurized air hose 176 by means of a conventional rotary coupling and valve 178.

During the initial upward movement of the socket defining members 54 and 55, they engage spring biases arms 180, each of which includes a top member 182 and a pair of legs 184 pivoted about pins 186 in blocks 188 fixed to plate 76. The arms 180 act as guides to orient the cup as it enters onto the base plate 52. This ensures the clearance of the socket forming members of the lower edges of the cup polygon base as they raise to surround and engage the cup. Engagement of the spring biased arms 180 by the socket defining members 54 and 55 cams them outwardly about pins 186. Nylon or other antifriction material can be applied to the sides of members 54 and 55 to facilitate this action.

The mounting bracket 216 for the lubricating portion 200 of the apparatus has slots 218 and nuts 220 which adjustably attach the portion 200 to the plate 40. Other mounting arrangements may be provided within the scope of the invention. Similarly, the solenoid valves 208 and 212 may be mounted in the conduits anywhere between the nozzle and the sources of water and air.

What is claimed is:

1. A lubricator for the inside top margin of a workpiece having an annular wall upon which a forming operation is to be performed, said lubricator including:

support means to maintain an annular wall of a workpiece in an upstanding position thereby to create an annular wall top end;

deflector means including an area of magnitude sufficient to act as an end closure for said annular wall top end;

said deflector mounted for axial movement into and out of engagement with said annular wall top end;

spray means for producing an annular spray pattern of atomized aqueous material on the inside top margin of said annular wall;

said spray means located centrally within said deflector means area and fixed axial movement with said deflector; and, means to actuate said spray means when said deflector is in engagement with said annular wall top end.

2. The lubricator of claim 1 in which the annular wall is part of a cup and said support means is a guide for movement of a plurality of such cups.

3. The lubricator of claim 1 in which said deflector means is cone shaped.

4. The lubricator of claim 1 in which the axial movement of said deflector is created by means of a fluid cylinder.

5. The lubricator of claim 4 in which said fluid is air.

6. The lubricator of claim 1 in which a mounting bracket is included to attach the lubricator to means by which the forming operation is to be performed.

7. The lubricator of claim 6 in which means by which the forming operation is to be performed creates a bead on the annular wall top end.

8. The spray means of claim 1 in which the annular spray pattern is created in a nozzle which mixes pressurized air and water.

9. The spray means of claim 8 in which the means to actuate said spray means includes a water line and first solenoid valve connected to the nozzle and a pressurized air line and a second solenoid valve connected to the nozzle.

* * * * *